Figure 1:
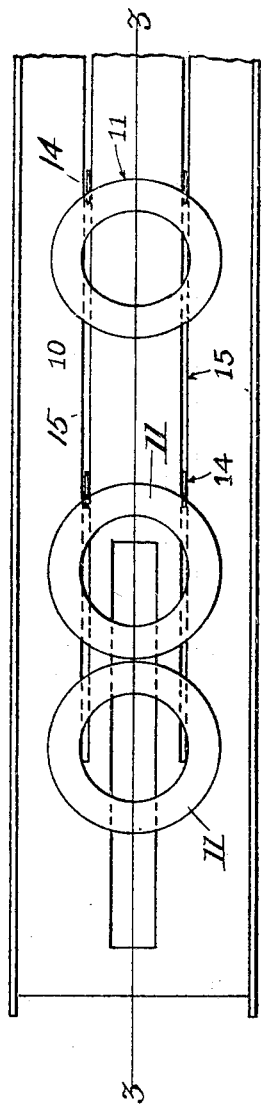

No. 801,523. PATENTED OCT. 10, 1905.
C. R. HINCHMAN & M. McMURRAY.
APPARATUS FOR CONVEYING BUNDLES OF WIRE RODS, &c.
APPLICATION FILED MAY 21, 1904.

4 SHEETS—SHEET 1.

WITNESSES:
W. Beall Williams
Chas. J. O'Neill

INVENTORS
C. R. Hinchman
Max McMurray
By their attys
Pennie & Goldsborough

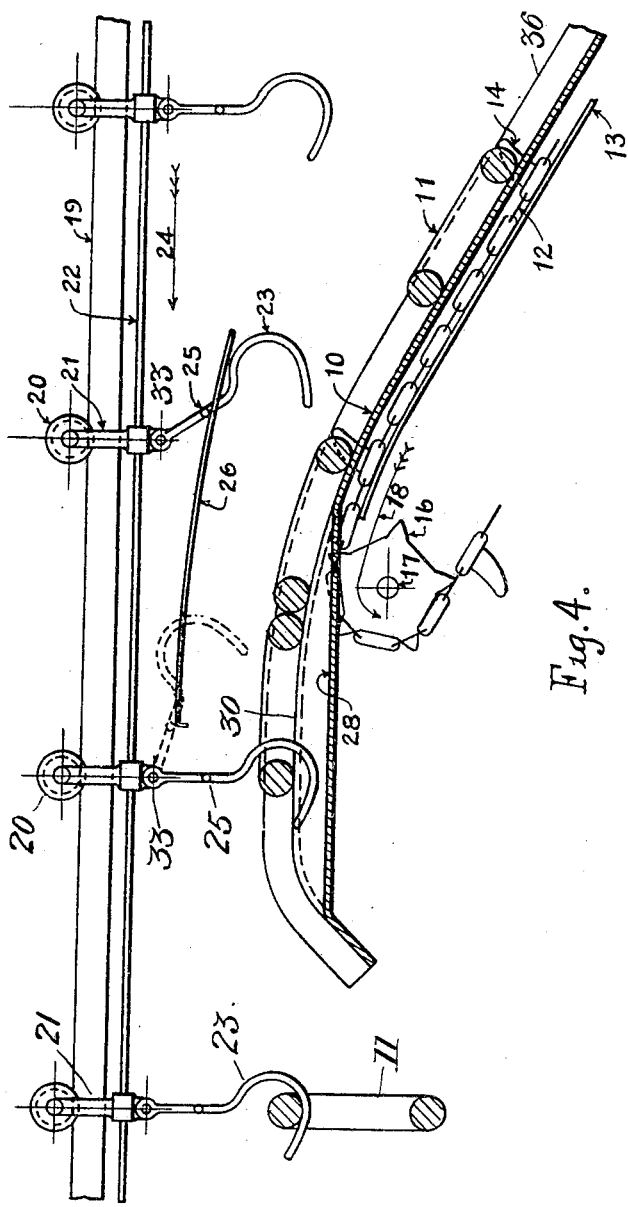

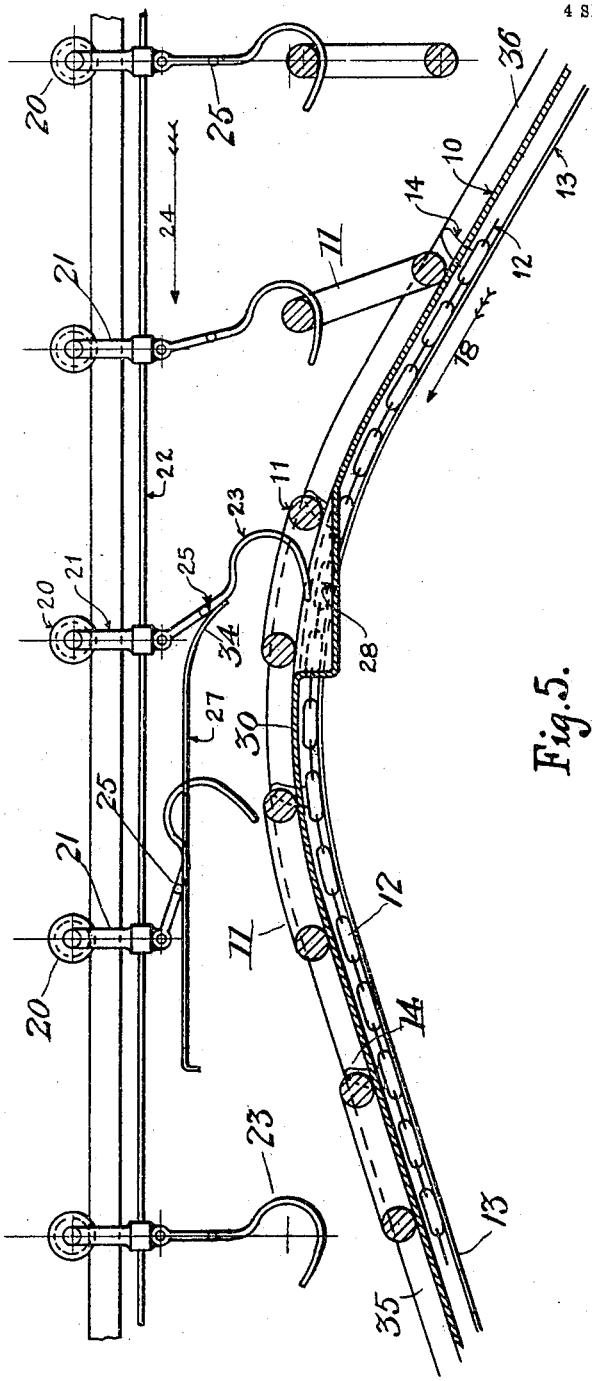

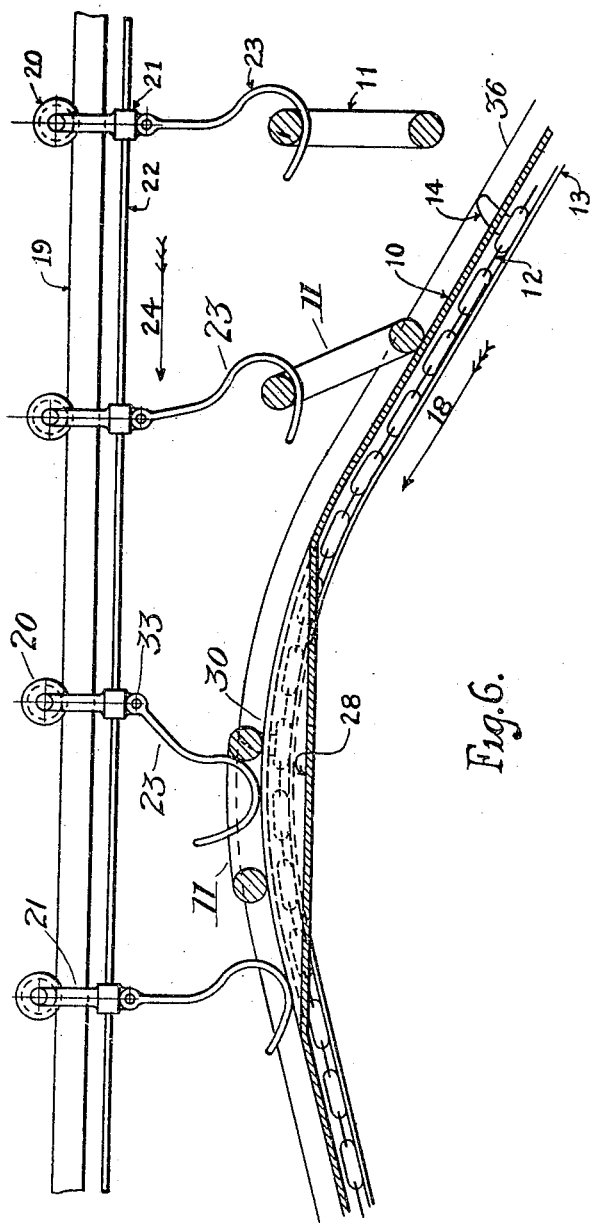

UNITED STATES PATENT OFFICE.

CHARLES R. HINCHMAN AND MAX McMURRAY, OF CLEVELAND, OHIO, ASSIGNORS TO THE AMERICAN STEEL & WIRE COMPANY OF NEW JERSEY, OF WORCESTER, MASSACHUSETTS, A CORPORATION OF NEW JERSEY.

APPARATUS FOR CONVEYING BUNDLES OF WIRE RODS, &c.

No. 801,523. Specification of Letters Patent. Patented Oct. 10, 1905.

Application filed May 21, 1904. Serial No. 209,029.

*To all whom it may concern:*

Be it known that we, CHARLES R. HINCHMAN and MAX McMURRAY, citizens of the United States, residing at Cleveland, county of Cuyahoga, State of Ohio, have invented certain new and useful Improvements in Apparatus for Conveying Bundles of Wire Rods and the Like; and we do hereby declare the following to be a full, clear, and exact description of the invention, such as will enable others skilled in the art to which it appertains to make and use the same.

Our invention relates to certain features and arrangements of conveying apparatus of a certain class which, broadly speaking, may be defined as comprising conveyers constructed and arranged to transport individual objects as contrasted with that class of conveyers which are constructed and arranged to convey material in bulk.

More specifically stated, the principal purpose for which our invention was designed is to accomplish the automatic transfer of bundles or coils of hot wire rods from the reels of a rod-rolling mill to the wire-drawing mill and the automatic removal of the same at the latter mill from the transferring means.

Heretofore it has been usual both to transport the bundles of hot wire rods from the conveyer at the reels to the hook conveyer (which carries them to the drawing-mill) and to remove the bundles from the hook conveyer by hand, which operations constitute very exhausting labor, and therefore add considerably to the expense. It must be understood, however, that our invention is not limited to the particular use mentioned, nor is it necessarily restricted to the conveying of bundles of wire rods, but may be used equally as well for the conveyance of other individual objects of a shape adapted to be engaged by the hooks or other supporting means which may be employed.

While in the preferred forms of our invention, which are those illustrated in the accompanying drawings, it is embodied in the combination of a hook conveyer and an endless-chain conveyer, which latter draws the bundles along over a stationary inclined surface, the two conveyers converging or approaching each other at a certain point and constructed and arranged to automatically transfer the bundles from the one conveyer to the other at the point of nearest approach, it will hereinafter clearly appear that as far as some of the essential features of our invention are concerned it includes within its scope the combination of the hook conveyer or its equivalent and stationary supporting-surfaces from or onto which the bundles or other objects may be taken or delivered.

The various arrangements and devices by which we are enabled to accomplish the above-mentioned results are clearly described in the following detailed description, which is to be taken in connection with the annexed four sheets of drawings, in which—

Figure 3:
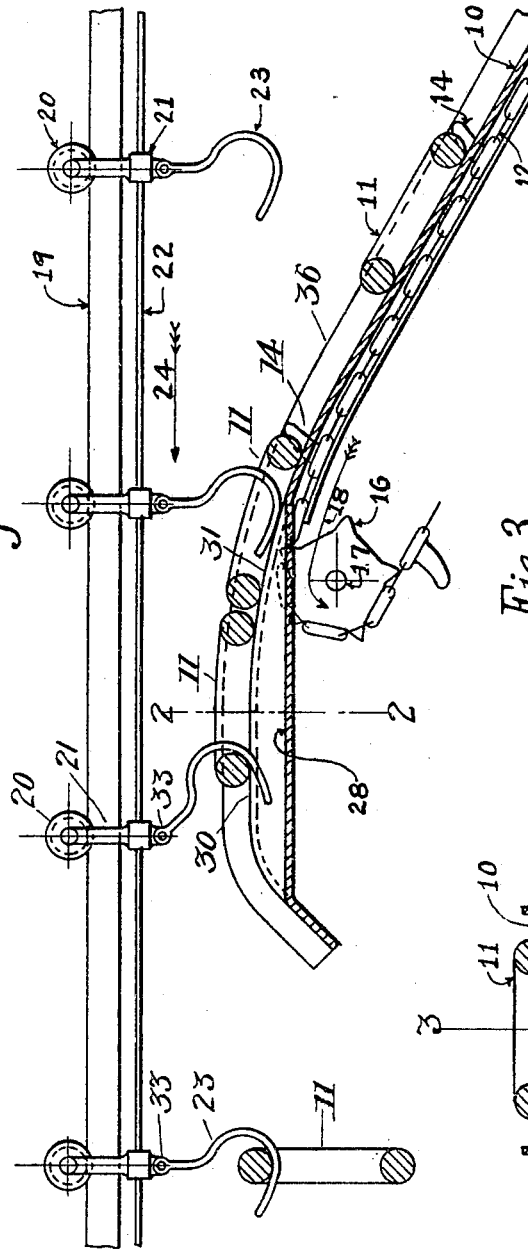
Figure 2:
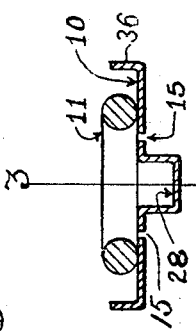

Figure 1 is a plan view of an inclined surface used in one embodiment of our invention on which the bundles of wire coming from the reels are placed, an endless-chain conveyer being shown for conveying them up said surface. Fig. 2 is a cross-section of said surface on the line 2 2 of Fig. 3. Fig. 3 is a side elevation of the hook conveyer and longitudinal central vertical section of the inclined surface and its endless-chain conveyer, taken on the line 3 3 of Fig. 2. Figs. 4, 5, and 6 are views similar to Fig. 3, but each showing a different form of the transfer means.

Referring first to Figs. 1, 2, and 3, the numeral 10 represents an inclined stationary surface, slotted, as at 15, over which the bundles of wire rods 11 are conveyed by means of the chain 12, supported on the surface 13 beneath the inclined surface 10, said chain having dogs 14 passing up through the slots 15 to engage the rear sides of the bundles 11. The chain 12 passes over a sprocket-wheel 16, mounted on a shaft 17 and arranged opposite the upper end of the inclined surface 10. Another sprocket-wheel is located at the lower end of said surface 10, and the wheel 16 acts to drive said chain 12. Connected with said inclined surface, at the upper end thereof, is a substantially horizontal surface 30, the two surfaces 10 and 30 being joined by an easy curve, as shown at 31 in Fig. 3. The longitudinal central portion of the horizontal surface 30 is recessed or cut away to form a channel 28, Figs. 2 and 3, which is substantially rectangular in cross-section. Located above the conveyer just described we have shown a horizontal conveyer of the hook type, comprising a supporting-rail 19, on which run wheels or rollers 20, journaled in brackets 21, to the lower ends of which are hung hooks 23 on pivots 33, which allow said hooks to swing in the vertical plane of the track 19. An endless rope or cable 22, to which the brackets 21 are connected at regular intervals, serves to move them along the track 19, and since it is essential that the ratio between the rate of travel of the hook-brackets and that of the chain conveyer be kept constant or that the two travel always at the same speed we prefer to employ the same driving means for both. The operation of this form of our invention is as follows: A coil or bundle of wire rods coming from the reels is conveyed up the inclined surface 10 by the dogs 14 of the chain 12, traveling in the direction of the arrow 18, and is delivered by said dogs onto the horizontal surface 30, where it remains stationary for a brief period—i. e., until it is removed by one of the hooks 23 in the manner to be described or until the next succeeding bundle pushes it off said surface. In practice, however, the two conveyers are so timed that just as each bundle reaches the top of the inclined surface 10 one of the hooks 23, traveling in the direction of the arrow 24, comes along and passes into the central aperture of the bundle, the point of the hook at this time passing down into the recess 28. As the hook continues in its horizontal path it comes into contact with the inside surface of the front portion of the bundle and pulls it off the surface 30, when both the hook and the bundle assume the vertical position shown at the left of Fig. 3, and the bundles are thereby conveyed to the wire-drawing mill or other point desired.

In Fig. 4 is illustrated a modification in which positive means are provided to swing the hooks backwardly on their pivots 33, said hooks being subsequently released to allow them to engage the bundles of wire 11. All the features of both conveyers are identical with those just described and being indicated by the same reference-numerals need no further description. The additional means referred to above comprises a fixed guide 26, supported in any suitable manner from the surface 10 or elsewhere and inclined upwardly in the direction in which the hooks are traveling, the hooks being provided with pins 25, extending laterally therefrom. As each hook comes along its pin 25 engages the lower end of said guide 26 and riding along on the same toward its higher end is elevated into the dotted-line position. When the pin 25 arrives at the end of the guide 26, the hook swings downwardly on its pivot through the central aperture of the bundle which has been deposited upon the horizontal surface 30. Thereupon the action is the same as in the case first described. The advantage of this arrangement resides in the fact that the arrival of a hook and of a bundle at the upper end of the inclined surface 10 does not have to be so accurately timed.

In Figs. 5 and 6 we have shown means whereby the bundles 11 can be removed from the hooks of the hook conveyer and deposited upon an endless-chain conveyer for transference to the wire-drawing mill or other point desired.

In Fig. 5 the hook conveyer comprises the track 19, wheels 20, brackets 21, and hooks 23, having the lateral pins 25, all as in the form just described. A stationary guide 27, somewhat similar to the guide 26, is provided, which is, however, horizontal for the major portion of its length, but is curved more sharply downward at its front end 34. The surface 10, to which in this case the bundles 11 are to be transferred instead of being removed therefrom, as in the previous examples, is inclined upwardly toward the hook conveyer, is curved in an arch at its upper end at 30, and is then inclined downwardly away from said hook conveyer at 35, all substantially as shown in said Fig. 5. The central portion is depressed at a point preceding the highest point of said surface to form the channel or recess 28, which in this case does not necessarily extend clear across the upper portion of the conveying-surface, as does the recess 28 in the horizontal portion 30 of the conveying-surface 10 in the embodiments of our invention heretofore described, but extends only, as shown, to about the highest point of the conveying-surface, the bottom of said recess being there joined by a substantially vertical wall with the surface 30. The operation of this form of our invention is as follows: A hook 23, from which a bundle of rods or wire 11 depends, traveling in the direction of the arrow 24, the lower end of the bundle strikes against the upwardly-inclined surface 10 and by the continued movement of said hook is dragged up said surface, assuming a more and more nearly horizontal position. During this period one or a pair of dogs 14, projecting upwardly through the slot or slots 15 in the surface 10 and traveling in the direction of the arrow 18 at a rate of speed equal to or having a constant ratio to the velocity of the hook conveyer, engages the rear end of the bundle. As the bundle arrives near the arched surface 30 the point of the hook enters the channel 28, and then the pin 25 of said hook engages the curved end of the guide 27. The hook by the continued movement of the conveyer in the direction of the arrow 24 is swung backwardly and upwardly by reason of its pin 25 riding up onto the guide 27 and is in consequence entirely withdrawn from the central aperture of the bundle 11, which latter is conveyed over the surface 30 and onto the downwardly-inclined surface 35 by the dogs 14.

In Fig. 6 we have shown how the same result can be obtained without the use of any guide, such as 27. The conveyers in this case are identical with those of the preceding example, with the exception that the recess 28 extends entirely across the highest portion 30 of the surface 10. The chain 12, however, in this instance is driven at a higher rate of speed than the cable 22. The consequence of this is that as the coils of wire 11 are laid down upon the surface 10 by the hooks 23 the dogs 14 carry the bundles forwardly faster than the hooks are traveling, and the inside surface of the bundles is thereby caused to engage the rear sides of the hooks, and the latter are consequently raised out of the bundles, as will be evident from an inspection of said figure.

In all the views similar parts are indicated by the same reference-numerals. We therefore have not considered it necessary to describe such parts in detail in connection with each of the modifications. The surface 10 in each case, as well as its continuations 30 and 35, are preferably formed with side flanges 36, as shown, to retain the coils centrally on said surfaces.

It will be obvious to those skilled in the art that various modifications in detail may be made without departing from the spirit of our invention.

What we claim is—

1. The combination of a supporting-surface having a central longitudinal groove formed therein, a conveyer supported to travel longitudinally above said surface, and having pivoted hooks depending therefrom, adapted to convey coils of wire or the like, a stationary guide located between said conveyer and said surface, and projections on said hooks to engage said guide, whereby said hooks will be swung backwardly on their pivots and caused to deposit coils upon said surface.

2. The combination of a longitudinally-recessed supporting-surface, a conveyer supported to travel above said surface, and having depending therefrom pivoted hooks adapted to convey coils of wire or the like, a stationary guide located between said conveyer and surface, and projections on said hooks adapted to engage said guide, whereby said hooks will be swung backwardly upon their pivots and then allowed to fall forward to enter a recess in said surface and engage with and carry away a coil suitably placed on said surface.

3. The combination of a substantially horizontal supporting-surface having one or more longitudinal recesses or grooves therein, an inclined surface leading up to said horizontal surface, a conveyer suitably supported to travel above said surfaces, pivoted hooks depending from said conveyer and adapted to convey coils of wire rods or the like against and up said inclined surface onto said horizontal surface, and means to cause said hooks to automatically deposit the coils upon said horizontal surface.

4. The combination of a substantially horizontal supporting-surface having one or more longitudinal recesses or grooves therein, an inclined surface leading up to said horizontal surface, a conveyer suitably supported to travel above said surfaces, pivoted hooks depending from said conveyer and adapted to convey coils of wire or the like against and up said inclined surface onto said horizontal surface, a stationary inclined guide located between said conveyer and surfaces, and projections on said hooks adapted to engage said guide, whereby said hooks will be automatically raised out of the coils and leave them upon said horizontal surface.

5. The combination of an inclined slotted surface, a traveling conveyer having means projecting through the slots of said surface to engage and convey a coil of wire or the like deposited upon said surface, a recessed surface joining said inclined surface at the top thereof, a conveyer suitably supported above said surfaces, and having means to carry coils of wire or the like depending therefrom, said means being adapted to enter the recesses of said horizontal surface, whereby the coils may be automatically transferred from one of said conveyers to the other.

6. The combination of a traveling hook conveyer, an endless-chain conveyer, a slotted supporting-surface through which said chain conveyer operates to convey coils of wire or the like, said surface having a recess at one point into which the lower ends of the hooks of said hook conveyer are adapted to enter, so as to cause the transfer of the coils at said point from one of said conveyers to the other.

7. The combination of a traveling hook conveyer, an endless-chain conveyer, said conveyers having a constant velocity ratio, a slotted supporting-surface located beneath said hook conveyer and through which said chain conveyer operates to convey coils of wire or the like, said surface having a recess at one point in which the lower ends of the hooks of said hook conveyer are adapted to enter.

8. The combination of a traveling hook conveyer, an endless-chain conveyer traveling at a higher rate of speed, a slotted supporting-surface through which said chain conveyer operates, said surface being located beneath said hook conveyer and having a recess at one point in which the lower ends of the hooks of said hook conveyer are adapted to enter, whereby coils of wire or the like will be automatically transferred from the hook conveyer to the chain conveyer at said point.

In testimony whereof we affix our signatures in presence of two witnesses.

CHARLES R. HINCHMAN.
MAX McMURRAY.

Witnesses:
JOHN H. EARLY,
GEORGE A. HOLLY.